R. KOEHLER.
LOCKING DEVICE.
APPLICATION FILED DEC. 27, 1915.

1,251,243.

Patented Dec. 25, 1917.

Inventor:
Rudolph Koehler.
By Herbert G. Fletcher
atty.

UNITED STATES PATENT OFFICE.

RUDOLPH KOEHLER, OF ST. LOUIS, MISSOURI.

LOCKING DEVICE.

1,251,243.  Specification of Letters Patent.  Patented Dec. 25, 1917.

Application filed December 27, 1915. Serial No. 68,621.

*To all whom it may concern:*

Be it known that I, RUDOLPH KOEHLER, a citizen of the United States of America, residing in the city of St. Louis and State of Missouri, have invented certain new and useful Improvements in Locking Devices for Locking the Motor-Control Levers of the Engine and Steering-Gear of an Automobile Together, of which the following is a specification.

This is a companion application to my application for Letters Patent on locking devices which was filed on November 20th, 1915, under Serial No. 62,467, this present application showing a different construction of locking device.

The object of this invention is to provide a locking device that is adapted to engage the steering wheel of an automobile as well as the engine control levers, commonly known as the carbureter lever and the spark control lever, so that all of said parts which are engaged by the locking device will be held against operable movement relative to controlling an automobile.

Figure 1:
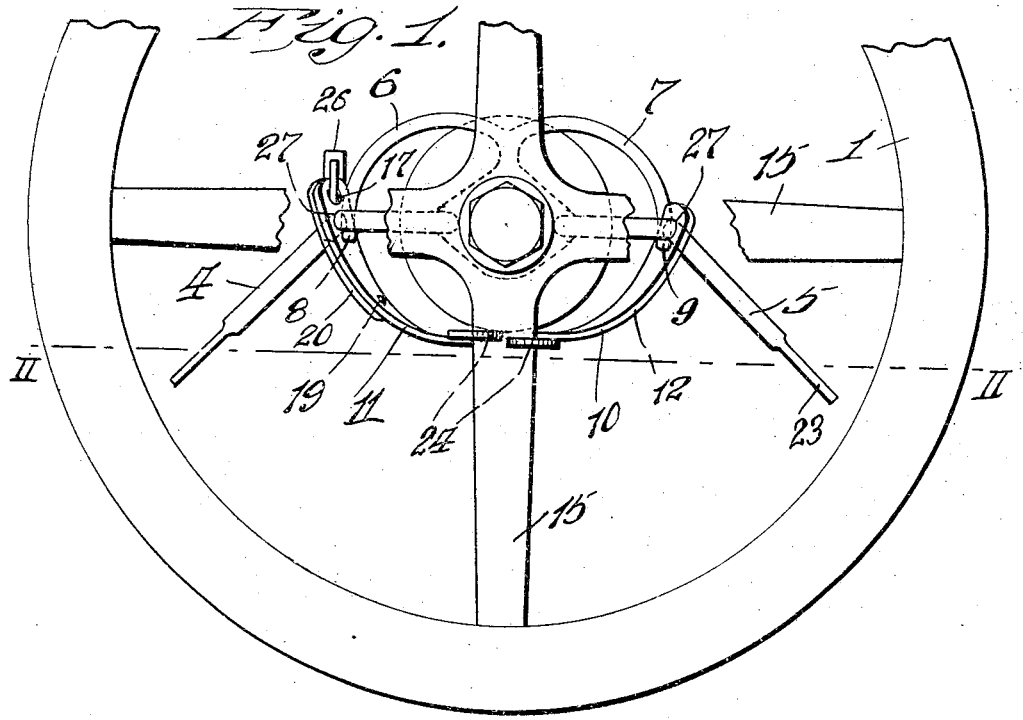
Figure 1 is a fragmentary plan view of the steering wheel of an automobile showing the engine control levers, this improved locking device being locked to the wheel and levers.

Referring by numerals to the accompanying drawings, 1 designates a steering wheel which is mounted to the upper end of a steering post 2, said post being mounted in the post support 3. Operatably mounted in the post support 3 is a carbureter control lever 4, and oppositely disposed to said lever 4 is a spark control lever 5, said levers being mounted on their respective quadrants 6 and 7, and are adapted to abut stops 8 and 9 respectively when said levers are moved into their inactive positions.

As shown in the drawings the locking device 10 is in a position of locking in which the steering wheel and engine control levers are engaged by the locking device and are held against being operated. The locking device 10 comprises a pair of movable members 11 and 12 that are pivoted to each other by the rivet 13. Formed on each of the members 11 and 12 adjacent the upper ends thereof is a recess 14, said recesses of said members being adapted to be engaged against and over the opposite sides of one of the spokes 15 of the steering wheel 1.

Formed in the member 12 adjacent the lower end thereof is an elongated opening 16. Formed in the lower end of the member 11 is an opening 17, and formed in said member adjacent said opening is a recess 18. Pivotally mounted at 19 to the member 11 is a locking plate 20, and formed in said plate is a recess 21 that is oppositely disposed to the recess 18 which is formed in the member 11. An opening 22 is also formed in said plate, said opening adapted to aline with the opening 17 of the member 11.

Figure 2:
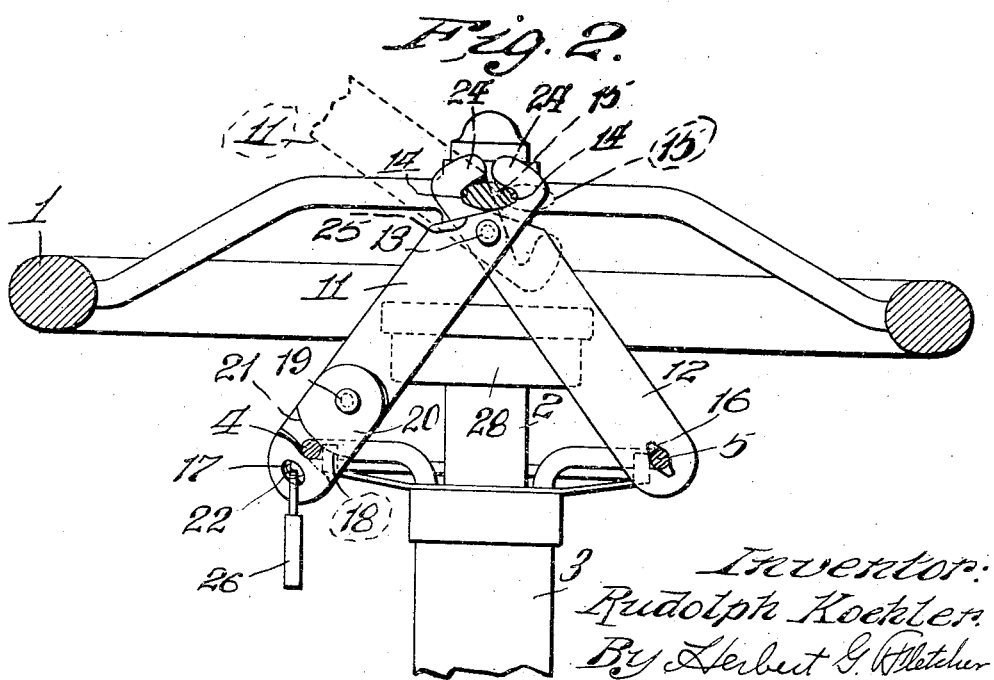
Fig. 2 is a sectional elevation taken on the line II—II of Fig. 1.

This improved locking device when not in use is entirely disengaged from the parts which it is adapted to lock. When it is desired to lock the controlling parts, the locking device 10 is engaged and the device is held in a position so that the elongated opening 16 of the member 12 can be mounted over the flattened engaging end 23 of the spark control lever 5. The members 11 and 12 are moved on the pivot 13 to an approximate position as shown by dotted lines in Fig. 2 so that the recesses 14 will be swung away from each other, in which the hook portions 24 of the said members will be in an opened position so that said hooks will be in a position ready for the reception of one of the spokes 15 of the steering wheel. The member 11 is then swung downwardly so that the hook 24 will ride over and against one side of the aforesaid spokes 15. This downward movement of the member 12 will also be assisted by the spoke of the wheel, providing the operator will turn the wheel a fractional distance to the right, in which the underface of the spoke will bear against the inclined edge 25 of the member 11.

Inasmuch as the first operation toward mounting this locking device in a locked position was to anchor the lower end of the member 12 to the spark lever 5, the spoke 15 of the wheel upon being moved to the right, as aforesaid, will engage in the recess 14 of said member 12, thereby pulling on said member and tending to move the outer end of said member upwardly, which upward movement will force the hooks 24 toward each other and over the top of the spoke. During the ride over movement of the hooks 24 relative to the spoke 15, the recess 18 of the member 12 was being engaged over the carbureter lever 4.

After the recess 18 is engaged over said lever 4, the locking plate 20 is then swung on its pivot and the recess 21 thereof will engage said lever on the side opposite to the engagement of the recess 18.

The openings 17 and 22 of the member 11 and plate 20 are then in alinement, and the lock 26 is engaged in said openings thereby locking the plate 21 in a closed position relative to the carbureter lever 4. In mounting this improved locking device it is preferable to mount the lower ends of the members 11 and 12 over the control levers adjacent the bent portions 27 thereof, said bent portions forming shoulders to said members.

When the device is mounted in a locked position as just related, the intermediate portions of the members 11 and 12 will bear against the boxing 28 and in which position of mounting relative to the position of engagement of the lower ends of the members against the bent portions 27 of the levers, the device is rigidly mounted to all of the parts to which it is adapted to grip.

When it is desired to dismount the locking device from the locked parts, the lock 26 is released from its locked position and the members 11 and 12 are swung to an approximate alining position relative to each other, said parts then being swung away from the wheel spoke, and the member 12 is disengaged from the spark control lever 5.

What I claim is:

1. A locking device for the steering wheel and engine control levers of an automobile, comprising a pair of members pivoted to each other, an engaging portion formed on each of said members adapted to engage a portion of said wheel, means for securing one of said members to one of said control levers and a securing member carried by the other of said pivoted members, said securing member when secured to one of said control levers adapted to prevent said members from being moved relative to one another.

2. A locking device for the steering wheel and engine control levers of an automobile, comprising a pair of members pivoted to each other, a spoke engaging portion formed on each of said members, an opening formed in one end of one of said members, a recess formed in one end of said other member, said opening of one of said members when mounted over one of said control levers providing means whereby said engaging portions of said members and said recessed end of one of said members can be simultaneously engaged over a spoke of said wheel and said other control lever respectively and locking means for securing said recessed end of one of said members to its respective control lever.

3. A locking device for the steering wheel and engine control levers of an automobile, comprising a pair of members pivoted to each other, a spoke engaging portion formed on each of said members, above the pivot of said members, said engaging portions being oppositely disposed relative to each other, an opening formed in one end of one of said members, a recess formed in one end of said other member, said opening of one of said members when mounted over one of said control levers providing means whereby said engaging portions of said members and said recessed end of one of said members can be simultaneously engaged over a spoke of said wheel and said other control lever respectively and means for locking one of said members against being disengaged from its respective control lever.

4. A locking device for the steering wheel and engine control levers of an automobile, comprising a pair of members pivoted to each other, an engaging portion formed on each of said members adapted to be engaged over one of the spokes of said wheel, a securing member carried by one of said pivoted members, an opening formed adjacent one end of said other pivoted member adapted to be engaged over one of said control levers, said securing member when secured to said other control lever adapted to prevent said engaging portions from becoming disengaged from the spoke of said wheel.

5. The combination with pivoted levers and a steering wheel, of a pair of pivotally mounted members, each provided with an engaging portion for engagement with said respective levers, means formed on said members for engagement with a portion of said wheel, and a locking element carried by one of said members for engagement with one of said levers.

6. The combination with pivoted levers and a steering wheel, of a pair of pivotally mounted members, each provided with an engaging portion for engagement with said respective levers, a recessed portion formed on each of said members for engagement with a portion of said wheel, and a locking element carried by one of said members for engagement with one of said levers.

7. The combination with pivoted levers and a steering wheel, of a pair of pivotally mounted members, each provided with an engaging portion for engagement with said respective levers, means formed on said members for engagement with a portion of said wheel, and a locking element swingingly secured to one of said members for securing said member to one of said levers.

RUDOLPH KOEHLER.

Copies of this patent may be obtained for five cents each, by addressing the "Commissioner of Patents, Washington, D. C."